US008066445B2

(12) United States Patent
Kwak et al.

(10) Patent No.: US 8,066,445 B2
(45) Date of Patent: Nov. 29, 2011

(54) APPARATUS FOR ADJUSTING LENGTH OF TENSION TIE FOR CABLE NETWORK ANTENNA

(75) Inventors: Changsoo Kwak, Daejeon (KR); Man-Seok Uhm, Daejeon (KR); Dong-Hwan Shin, Daejeon (KR); In-Bok Yom, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 0 days.

(21) Appl. No.: 12/818,208

(22) Filed: Jun. 18, 2010

(65) Prior Publication Data

US 2011/0061210 A1 Mar. 17, 2011

(30) Foreign Application Priority Data

Sep. 14, 2009 (KR) ........................ 10-2009-0086526

(51) Int. Cl.
*F16B 7/10* (2006.01)

(52) U.S. Cl. ..................... 403/109.3; 403/103; 403/104; 403/108

(58) Field of Classification Search ......... 403/84–109.8; 52/146, 148; 135/75
See application file for complete search history.

(56) References Cited

U.S. PATENT DOCUMENTS

| | | | | |
|---|---|---|---|---|
| 3,662,436 | A * | 5/1972 | Roza | 403/306 |
| 5,680,145 | A | 10/1997 | Thomson et al. | |
| 2009/0250088 | A1 * | 10/2009 | Gibbons et al. | 135/73 |

* cited by examiner

*Primary Examiner* — Victor MacArthur
(74) *Attorney, Agent, or Firm* — Rabin & Berdo, P.C.

(57) ABSTRACT

An apparatus for adjusting the length of a tension tie mounted on a deployable antenna based on a cable network structure includes a cable retainer provided with a retaining hole, a cable being connected to the cable retainer; a retaining case coupled to the outer periphery of the cable retainer and provided with a plurality of retaining holes; and a retainer positioned inside the cable retainer and configured to extend through the retaining hole of the cable retainer and through one of the retaining holes of the retaining case so that the cable retainer and the retaining case are prevented from moving in the longitudinal direction.

10 Claims, 7 Drawing Sheets

APPARATUS FOR ADJUSTING LENGTH OF TENSION TIE FOR CABLE NETWORK ANTENNA

CROSS-REFERENCE TO RELATED APPLICATIONS

The present application claims priority of Korean Patent Application No. 10-2009-0086526, filed on Sep. 14, 2009, which is incorporated herein by reference in its entirety.

BACKGROUND OF THE INVENTION

1. Field of the Invention

Exemplary embodiments of the present invention relate to an apparatus for adjusting the length of a tension tie for a large deployable antenna, which is a structure based on a cable network; and, more particularly, to an apparatus for adjusting the length of a tension tie for a cable network antenna, which includes a retaining case provided with a plurality of retaining holes and a retainer inserted into one of the retaining holes so that the length can be adjusted precisely at a narrow interval.

2. Description of Related Art

As generally known in the art, a cable network refers to a number of interconnected cables, which are structured and tensioned to form a structure having predetermined rigidity.

FIG. 1 is a schematic perspective view illustrating a deployable antenna made of a cable network, to which the present invention pertains. As illustrated, the deployable antenna 100 made of a cable network includes a front net 110, a rear net 120, and tension ties 130 connecting nodes of the front net 110 with corresponding nodes of the rear net 120.

A rim truss 140 extends along the periphery of the cable structure to support it as a single structure. A conductive mesh 150 is finally attached in the shape of the front net to form a reflective surface of a desired shape. The rim truss 140 is collapsible, i.e. it can be folded into a smaller size, and so are the cable network and the mesh 150. Such an antenna is transported to the space and then deployed to have a diameter of 10m or larger (i.e. circular-aperture paraboloidal antenna).

The function of the tension ties 130 will now be described in detail. The tension ties 130 connect nodes of the front and rear nets to each other. The length of each tension tie is determined based on the height of the paraboloid at the coordinate of each tension tie so that the front and rear nets create symmetric paraboloids. If necessary, the reflective surface may be planar or spherical, instead of paraboloidal. In theory, the length of tension ties for antennas having such construction needs no adjustment. However, errors related to the length of cables, points of connection between respective cables, the overall structural shape of the antenna, etc. necessitate adjustment of the length of tension ties.

Furthermore, tension ties are not very long, which means that it is easy to fabricate tension ties that meat allowed tolerances. Overall structural shape error necessitates tuning of tension tie's length in order to compensate the shape error. The number of tension ties mainly depends on the size of the antenna. Specifically, antennas of about 10 m require hundreds of tension ties. Adjustment of the length of such tension ties require a lot of time and manpower, which eventually increases the product price.

It can be therefore said that the length of tension ties needs to be adjusted easily and rapidly. The amount of adjustment of the length of tension ties is given by measurement of the reflective surface. In order to confirm that the length has been adjusted as desired, the operator needs to easily check the amount of adjusted length by the naked eye.

FIG. 2 is a schematic perspective view illustrating the structure of a conventional tension tie disclosed in U.S. Pat. No. 5,680,145 of Astro Aerospace Corporation. The tension tie includes a spring 202, a spring case 201, a tension tie cable 203, and components 204*a* and 204*b* for connecting the tension tie to front and rear nets. This prior art document mentions no method for adjusting the length of the tension tie. It is thought that, according to such structure, the length of the spring increases or decreases in proportion to variation in length of the tension tie so that the length is automatically adjusted. This method may effectively correct the length of only a few local tension ties of the entire antenna. However, if there is an overall deviation of the length of tension ties, it cannot be corrected by the conventional method. More specifically, if an accurate paraboloid fails to be formed on the reflective surface of the front net by tension ties (i.e. if the overall curvature is incorrect), such deviation cannot be corrected automatically. Furthermore, even if a surface has been formed automatically, it is impossible to manually correct a part of it when necessary.

In the end, the spring is assembled while being tensioned to some extent. If the antenna is folded, there is no tension, and friction exits between the spring and the case. The tension tie begins to be tensioned as the folded antenna is deployed. It is not until the tension overcomes the friction between the spring and the case that the length increases up to the assembly length (i.e. final length) so that the desired reflective surface is formed. In other words, insufficient tension may fail to overcome the friction between the spring and the case, deviating from the final length of the tension tie.

SUMMARY OF THE INVENTION

An embodiment of the present invention is directed to an apparatus configured to enable the manufacturer to adjust the length of tension ties, which form the reflective surface of a deployable antenna based on a cable network structure, by a predetermined interval and to easily check the adjusted length by the naked eye so that, by adjusting the length as desired, a large deployable antenna with a correct surface can be fabricated easily.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for adjusting the length of a tension tie mounted on a deployable antenna based on a cable network structure includes: a cable retainer provided with a retaining hole, a cable being connected to the cable retainer; a retaining case coupled to the outer periphery of the cable retainer and provided with a plurality of retaining holes; and a retainer positioned inside the cable retainer and configured to extend through the retaining hole of the cable retainer and through one of the retaining holes of the retaining case so that the cable retainer and the retaining case are prevented from moving in the longitudinal direction.

The retainer may include a retaining member movement guide protruding from the inner peripheral surface of the cable retainer toward the retaining hole; a retaining member inserted inside the retaining member movement guide and configured to extend through the retaining hole of the cable retainer and through one of the retaining holes of the retaining case; and an elastic member mounted beneath the retaining member and supported on the retaining member movement guide so as to provide the retaining member with elastic force toward the retaining hole of the cable retainer and one of the retaining holes of the retaining case.

Alternatively, the retainer may include a leaf spring supported on the inner peripheral surface of the cable retainer and configured to protrude toward the retaining hole; and a retaining member supported on the leaf spring and configured to extend through the retaining hole of the cable retainer and one of the retaining holes of the retaining case.

The leaf spring may be selected from an arch-shaped leaf spring and a spherical leaf spring.

The leaf spring may be provided with a retaining member insertion hole, and the retaining member may be inserted into the retaining member insertion hole of the leaf spring.

The retaining case may have a circular or rectangular cross-sectional shape.

The plurality of retaining holes of the retaining case may be arranged in a zigzag direction with regard to the longitudinal direction.

The plurality of retaining holes of the retaining case may be arranged in a slanted direction with regard to the longitudinal direction.

DESCRIPTION OF SPECIFIC EMBODIMENTS

Figure 1:
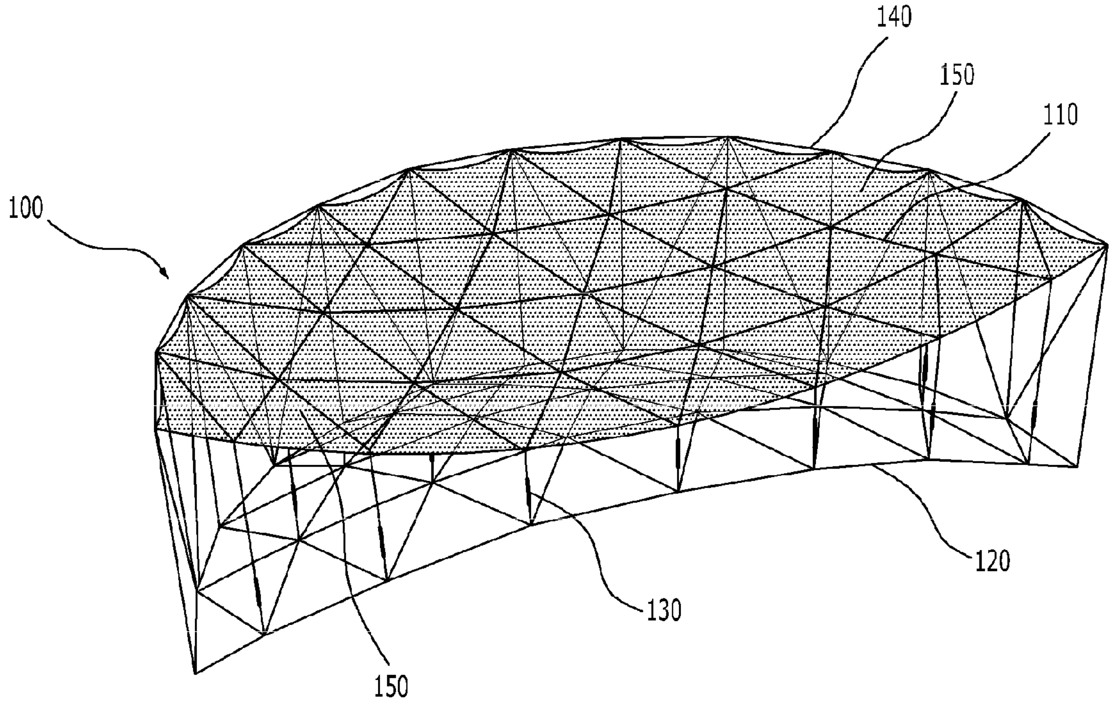
FIG. 1 (PRIOR ART)
FIG. 1 is a schematic perspective view illustrating a deployable antenna based on a cable network, to which the present invention pertains.
Figure 2:
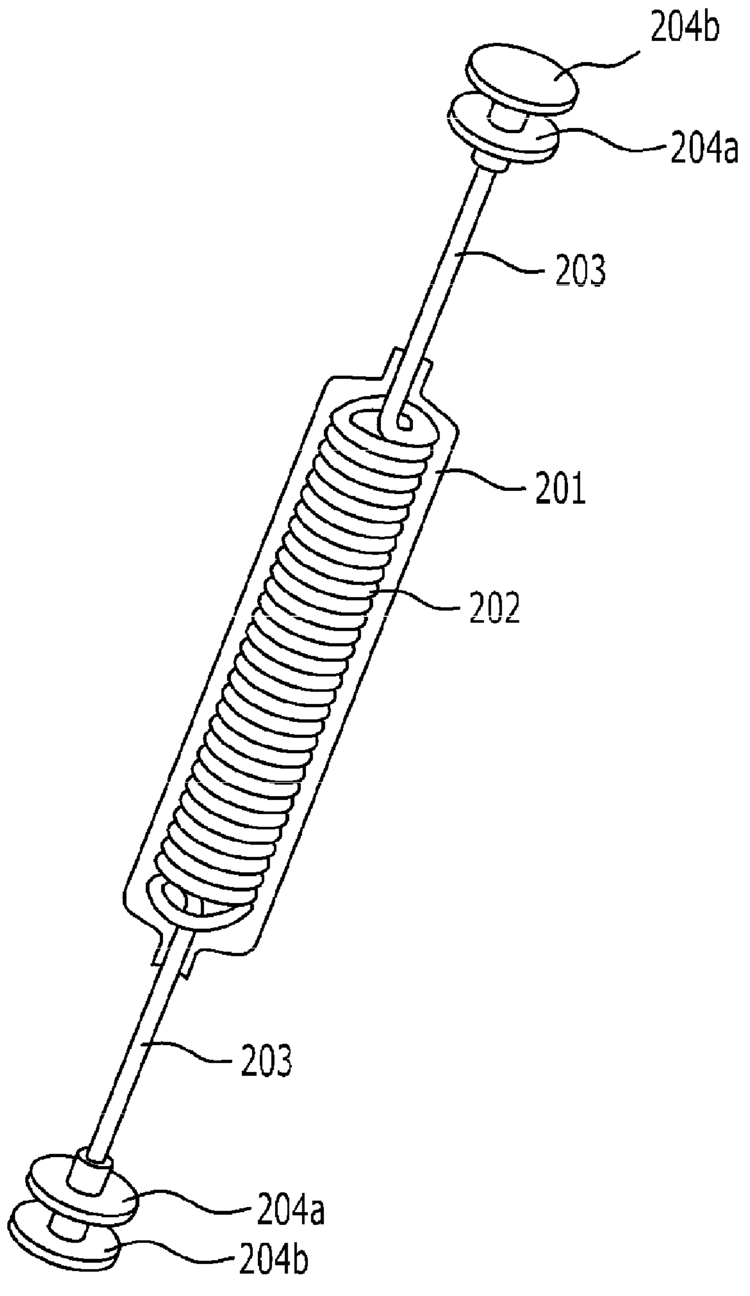
FIG. 2 (PRIOR ART)
FIG. 2 is a schematic perspective view illustrating the structure of a conventional tension tie.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 3:
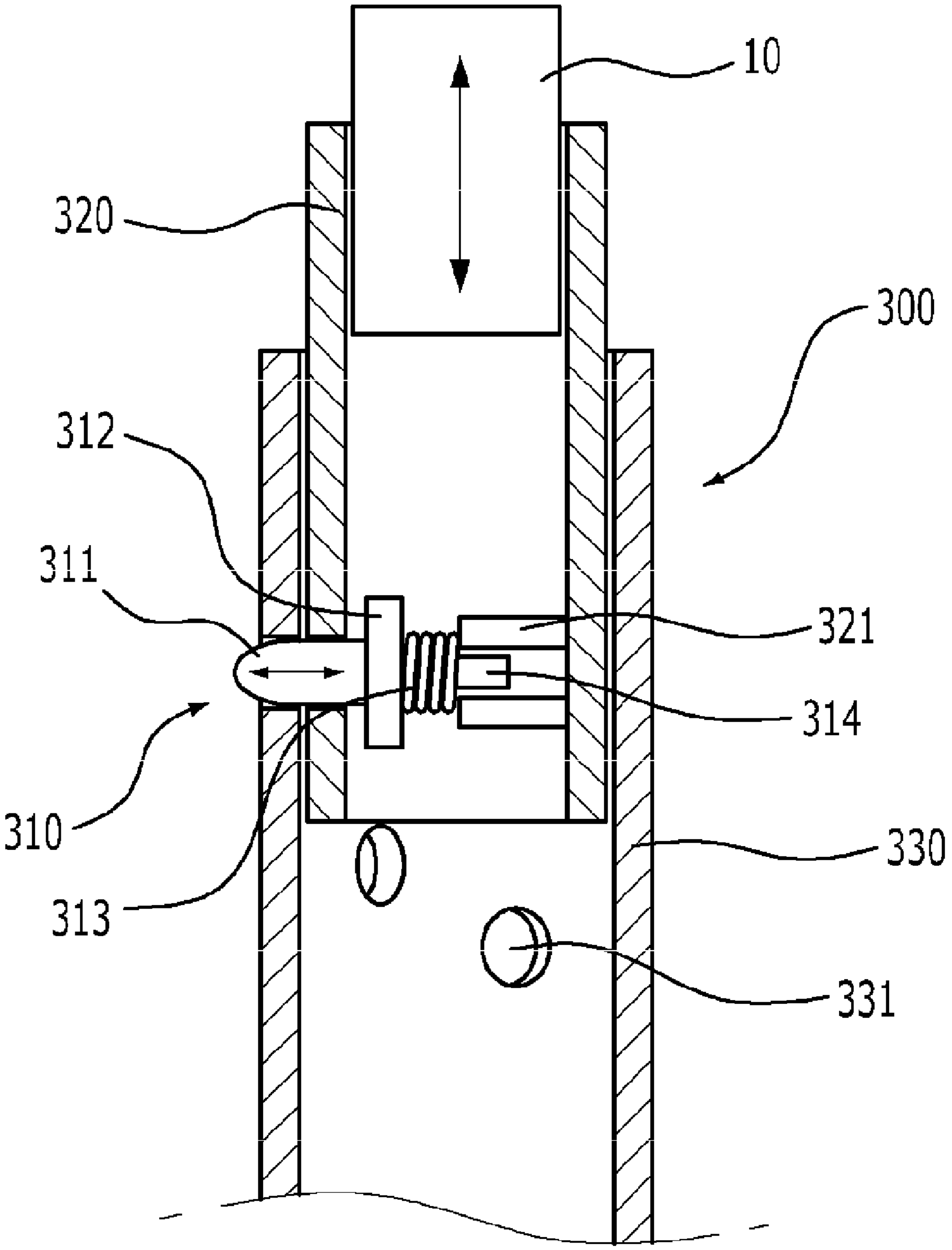
FIG. 3 is a schematic partial sectional view illustrating an apparatus for adjusting the length of a tension tie for a cable network antenna in accordance with an embodiment of the present invention.

FIG. 3 is a schematic partial sectional view illustrating an apparatus for adjusting the length of a tension tie for a cable network antenna in accordance with an embodiment of the present invention. As illustrated, the apparatus 300 for adjusting the length of a tension tie for a cable network antenna in accordance with the present invention includes a retainer 310, a cable retainer 320, and a retaining case 330.

The cable retainer 320 has an end connected to a cable 10, and is provided with a retaining hole. The retaining case 330 is coupled to the outer periphery of the cable retainer 320, and has a plurality of retaining holes formed to correspond to the retaining hole of the cable retainer 320. The retainer 310 is positioned inside the cable retainer 320 so as to extend through the retaining hole of the cable retainer, as well as through one of the retaining holes of the retaining case 330, so that the cable retainer and the retaining case are prevented from moving in the longitudinal direction.

More specifically, referring to FIG. 3, the retainer 310 in accordance with an embodiment of the present invention includes a retaining member 311, a retaining member movement guide 321, and an elastic member 313. The retaining member movement guide 321 protrudes from the inner peripheral surface of the cable retainer 320 toward the retaining hole. The retaining member 311 is inserted inside the retaining member movement guide 321 so as to extend through the retaining hole of the cable retainer 320 and one of the retaining holes of the retaining cases 330. The elastic member 313 is mounted beneath the retaining member and is supported on the retaining member movement guide so that the retaining member is provided with elastic force toward the retaining hole of the cable retainer and one of the retaining holes of the retaining case. In accordance with a specific embodiment of the present invention, the elastic member of the retainer 310 consists of a coil spring.

The retaining member 311 includes a support plate 312 and a guide pin 314. The support plate 312 supports the elastic member 313 when it is inserted and coupled. The guide pin 314 is inserted into the retaining member movement guide 321.

Figure 4:
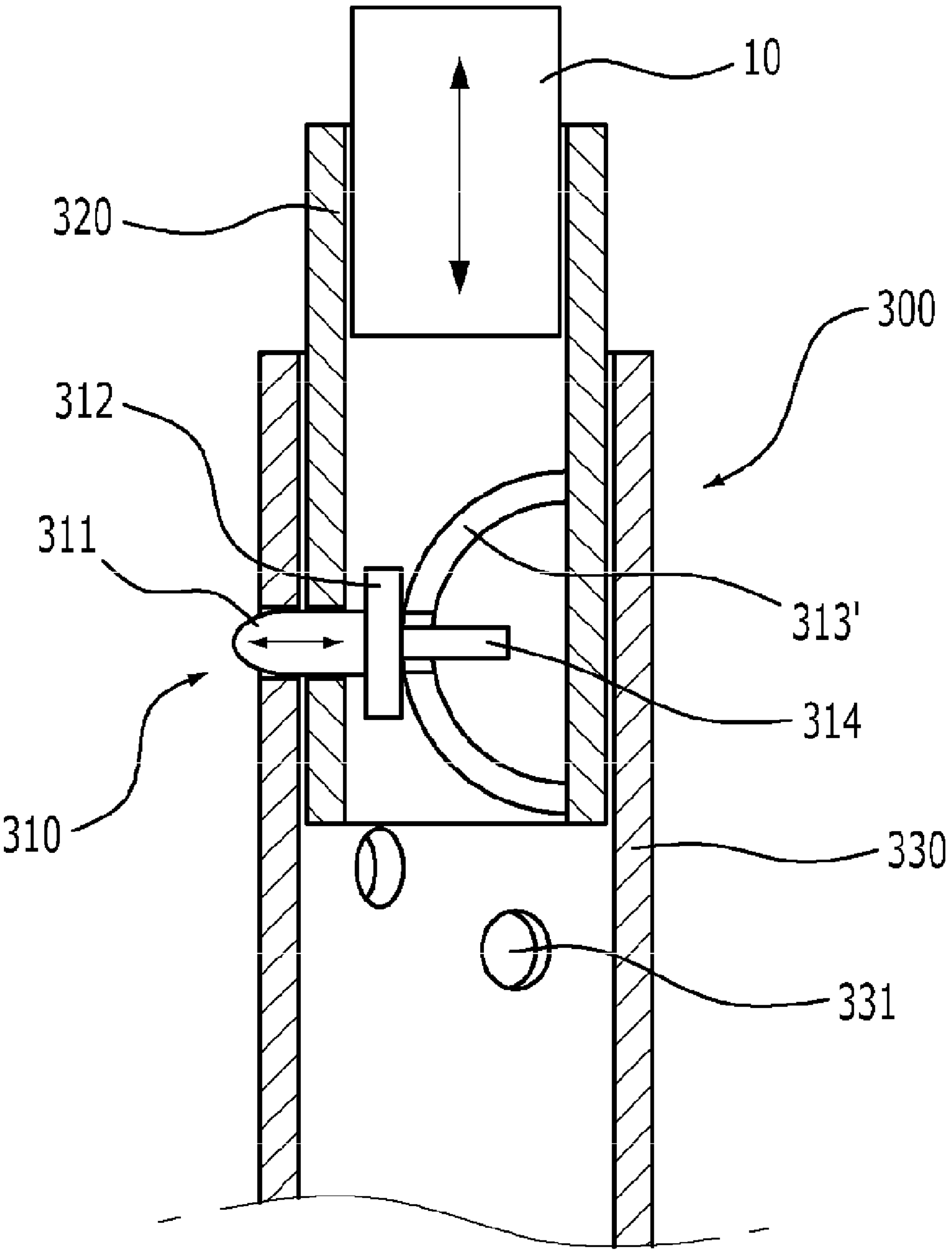
FIG. 4 is a schematic partial sectional view illustrating an apparatus for adjusting the length of a tension tie for a cable network antenna in accordance with another embodiment of the present invention.

FIG. 4 is a schematic partial sectional view illustrating an apparatus for adjusting the length of a tension tie for a cable network antenna in accordance with another embodiment of the present invention. As illustrated, the retainer 310 includes a leaf spring 313' and a retaining member 311. The retaining member has the same construction as has been described with reference to FIG. 3. The leaf spring 313' is supported on the inner peripheral surface of the cable retainer, and protrudes toward the retaining hole. The leaf spring 313' is provided with a retaining member insertion hole, into which the retaining member 311 is inserted and supported.

Figure 5A:
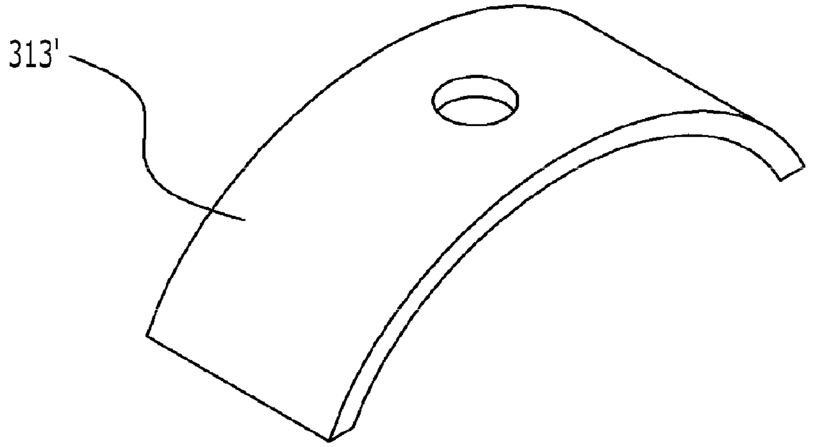
FIG. 5A is a perspective view illustrating an exemplary leaf spring for the apparatus for adjusting the length of a tension tie illustrated in FIG. 4.
Figure 5B:
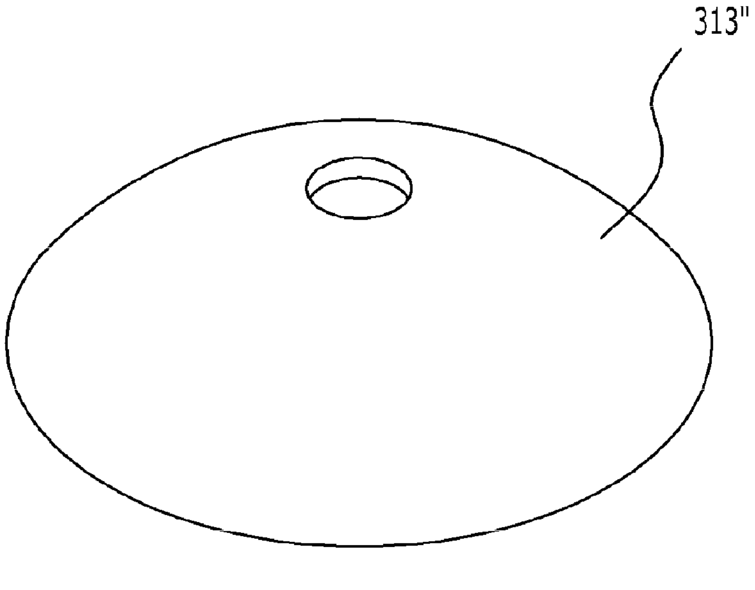
FIG. 5B is a perspective view illustrating another exemplary leaf spring for the apparatus for adjusting the length of a tension tie illustrated in FIG. 4.

The leaf spring may be an arch-shaped leaf spring 313' as illustrated in FIG. 5A, or a spherical leaf spring 313" as illustrated in FIG. 5B.

The leaf spring is provided with a retaining member mounting hole, into which the retaining member is inserted.

Figure 6A:
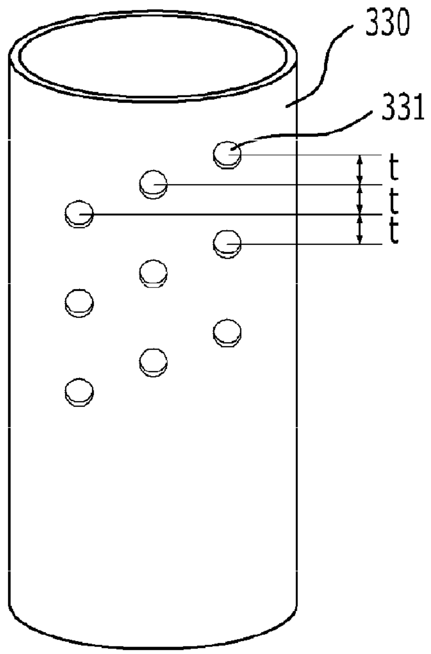
FIG. 6A is a schematic perspective view illustrating a retaining case of an apparatus for adjusting the length of a tension tie in accordance with an embodiment of the present invention.
Figure 6B:
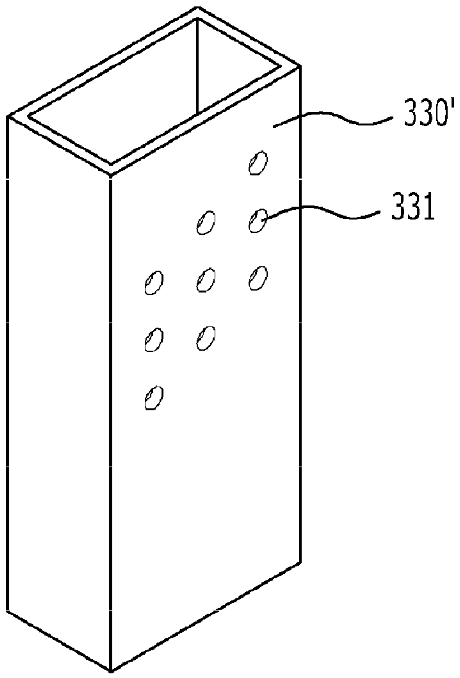
FIG. 6B is a schematic perspective view illustrating a retaining case of an apparatus for adjusting the length of a tension tie in accordance with another embodiment of the present invention.

FIG. 6A is a schematic perspective view illustrating a retaining case of an apparatus for adjusting the length of a tension tie in accordance with an embodiment of the present invention. FIG. 6B is a schematic perspective view illustrating a retaining case of an apparatus for adjusting the length of a tension tie in accordance with another embodiment of the present invention.

As illustrated, the retaining case may have a circular or rectangular cross section depending on the shape of the cable 10, which moves vertically so that the overall length of the tension tie varies, and which is retained by the cable retainer 320.

The plurality of retaining holes 331 of the retaining case may be arranged at a predetermined longitudinal interval t along a zigzag or slanted direction.

For example, if the length of the tension tie needs to be adjusted by 0.5 mm, the retaining holes 331 are arranged at a longitudinal interval of 0.5 mm. If the diameter of the retaining holes is smaller than 0.5 mm, they can be arranged along a straight line in the longitudinal direction. However, it is impractical to have a hole diameter less than 0.5 mm. Therefore, the retaining holes are arranged along a zigzag or slanted direction if the longitudinal interval is supposed to be smaller than the diameter.

Depending on the location of the reflective surface, or due to other factors, the length of tension tiles needs to be adjusted at a narrower interval so that the overall amount of adjustment is smaller. Alternatively, the length needs to be adjusted at a wider interval so that the overall amount of adjustment is larger. Considering this, retaining cases 330 having retaining holes 331 arranged at different intervals may be prepared and selectively used as desired.

According to the above-mentioned construction, the length of the tension tie is adjusted by inserting the retainer 310 into a desired hole of the case. Specifically, the retainer 310 is moved from a retaining hole to another in the following manner: the retaining member 311 is pushed back by a slender rod, for example, so that it is detached from the retaining hole. The cable retainer 320 is moved to a desired position. Then, the retaining member is inserted into another retaining hole and repositioned by restoring force from the spring.

Figure 7:
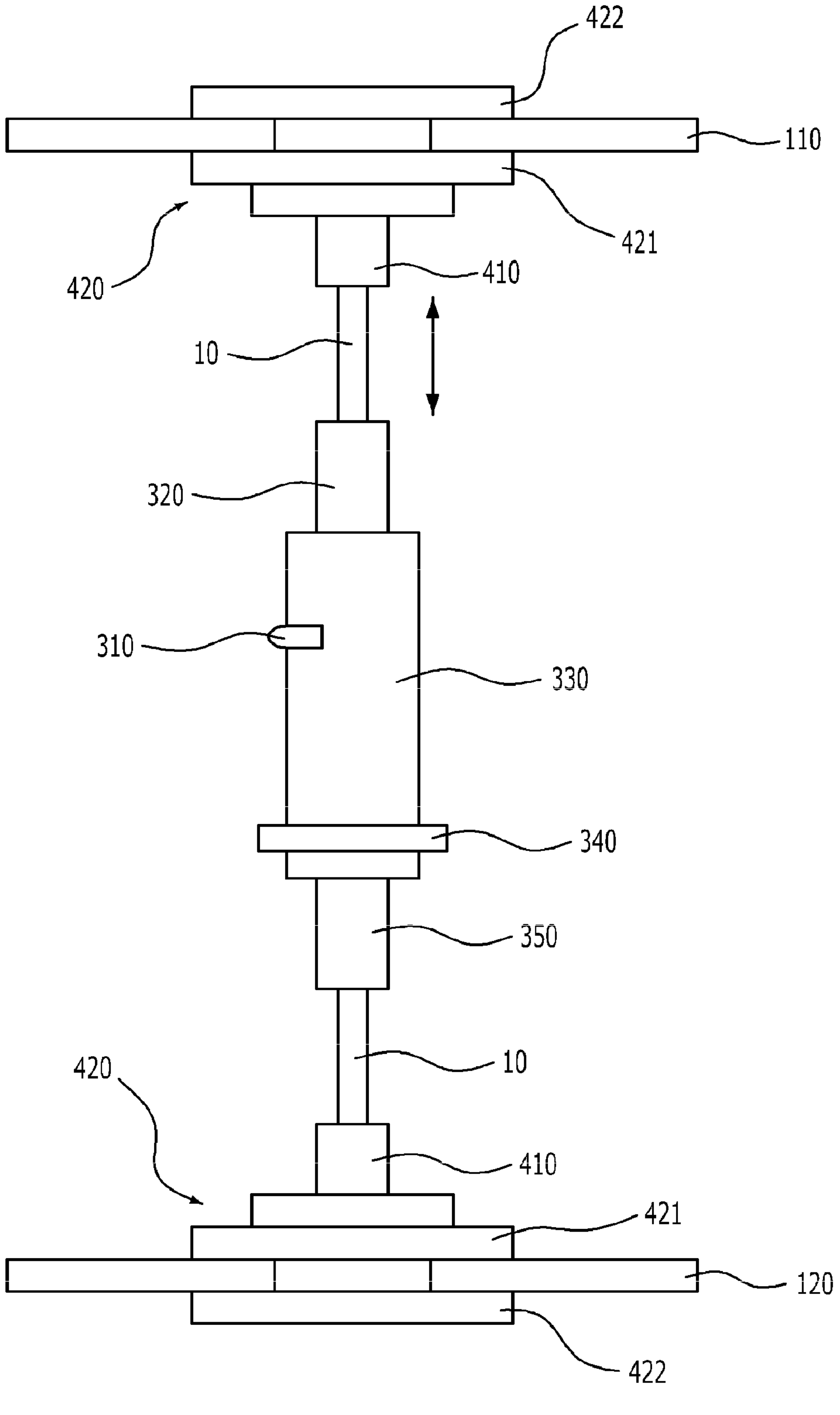
FIG. 7 is a schematic view illustrating the construction of an apparatus for adjusting the length of tension tie for a cable network antenna in accordance with the present invention, which is fitted to a cable network.

FIG. 7 is a schematic view illustrating the construction of an apparatus for adjusting the length of tension tie for a cable network antenna in accordance with the present invention, which is fitted to a cable network. As illustrated, the tension tie retaining cable 10 is attached to the front net 110 by a tension tie cable outer surface attachment device 421 and an inner surface attachment device 422, and is attached to the rear net 120 in a similar manner. The direction of the apparatus for adjusting the length of the tension tie illustrated in FIG. 7 may be reversed. The tension tie retaining cable 10 is retained by a tension tie cable retaining pin 340 and a tension tie retaining cable retaining device 350. However, the specific manner of retaining is not limited to that. Furthermore, although only one side consists of a tension tie retaining cable in accordance with this specific embodiment, both sides may consist of a tension tie length adjustment cable.

In accordance with the exemplary embodiments of the present invention, the apparatus for adjusting the length of tension ties for a cable network antenna enables the operator to accurately and easily adjust the length of tension ties as desired. This reduces the working time and decreases the manufacturing cost. By replacing the case, which determines the length adjustment interval, the precision of length adjustment and the possible amount of overall adjustment are varied so that different situations can be dealt with. Furthermore, the fact that the antenna is folded after being adjusted to have the desired length guarantees that, when deployed, the antenna always maintains the final length.

While the present invention has been described with respect to the specific embodiments, it will be apparent to those skilled in the art that various changes and modifications may be made without departing from the spirit and scope of the invention as defined in the following claims.

What is claimed is:

1. An apparatus for adjusting the length of a tension tie mounted on a deployable antenna based on a cable network structure, the apparatus comprising:

a cable retainer provided with a retaining hole, a cable being connected to the cable retainer;

a retaining case coupled to the outer periphery of the cable retainer and provided with a plurality of retaining holes; and a retainer positioned inside the cable retainer and configured to extend through the retaining hole of the cable retainer and through one of the retaining holes of the retaining case so that the cable retainer and the retaining case are prevented from moving in the longitudinal direction, wherein the retainer comprises:

a retaining member movement guide protruding from the inner peripheral surface of the cable retainer toward the retaining hole;

a retaining member inserted inside the retaining member movement guide and configured to extend through the retaining hole of the cable retainer and through one of the retaining holes of the retaining case; and an elastic member mounted beneath the retaining member and supported on the retaining member movement guide so as to provide the retaining member with elastic force toward the retaining hole of the cable retainer and one of the retaining holes of the retaining case.

2. The apparatus of claim 1, wherein the retaining case has a circular or rectangular cross-sectional shape.

3. The apparatus of claim 1, wherein the plurality of retaining holes of the retaining case are arranged in a zigzag direction with regard to the longitudinal direction.

4. The apparatus of claim 1, wherein the plurality of retaining holes of the retaining case are arranged in a slanted direction with regard to the longitudinal direction.

5. The apparatus of claim 1, wherein the retainer includes a guide pin that is inserted into a hole defined by the retaining member movement guide.

6. An apparatus for adjusting the length of a tension tie mounted on a deployable antenna based on a cable network structure, the apparatus comprising:

a cable retainer provided with a retaining hole, a cable being connected to the cable retainer;

a retaining case coupled to the outer periphery of the cable retainer and provided with a plurality of retaining holes; and a retainer positioned inside the cable retainer and configured to extend through the retaining hole of the cable retainer and through one of the retaining holes of the retaining case so that the cable retainer and the retaining case are prevented from moving in the longitudinal direction, wherein the retainer comprises:

a leaf spring supported on the inner peripheral surface of the cable retainer and configured to protrude toward the retaining hole of the cable retainer; and a retaining member supported on the leaf spring and configured to extend through the retaining hole of the cable retainer and one of the retaining holes of the retaining case, wherein the leaf spring is provided with a retaining member insertion hole, and the retaining member is inserted into the retaining member insertion hole of the leaf spring.

7. The apparatus of claim 6, wherein the leaf spring is selected from an arch-shaped leaf spring and a spherical leaf spring.

8. The apparatus of claim 6, wherein the retaining case has a circular or rectangular cross-sectional shape.

9. The apparatus of claim 6, wherein the plurality of retaining holes of the retaining case are arranged in a zigzag direction with regard to the longitudinal direction.

10. The apparatus of claim 6, wherein the plurality of retaining holes of the retaining case are arranged in a slanted direction with regard to the longitudinal direction.

* * * * *